June 9, 1964    P. G. PEROTTO    3,136,979

CHECKING DEVICE FOR RECORD PROCESSING MACHINES

Filed Sept. 28, 1959

INVENTOR
PIER GIORGIO PEROTTO
BY
Kenyon & Kenyon
ATTORNEYS

United States Patent Office 3,136,979

Patented June 9, 1964

3,136,979

CHECKING DEVICE FOR RECORD PROCESSING MACHINES

Pier Giorgio Perotto, Turin, Italy, assignor to Ing. C. Olivetti & C., S.p.A., Ivrea, Italy, a corporation of Italy Filed Sept. 28, 1959, Ser. No. 842,641
Claims priority, application Italy Oct. 4, 1958
7 Claims. (Cl. 340—172.5)

The present invention relates to checking devices for record processing machines.

In an electromechanical card punch the punches are first selected by the electric signals representing the information to be punched, and then actuated. It may occur that a punch is not selected by the corresponding electric signal due to a failure either of its selector magnet or of mechanical parts; likewise, a punch, duly selected and actuated, may be blocked due either to friction or to failure of its reset command, thus unduly punching further holes. Obviously, these failures cause the information to be uncorrectly punched into the card.

In a known card punching machine the accuracy of the punching operation is checked by comparing the entered information controlling the punches with the information thereafter read on the punched card. In order to simplify the checking circuits, parity check digits are separately generated from the entered information and the read information and subsequently compared. By way of example, a separate parity check binary digit or bit may be used for a group of card columns or for a card row.

A greater accuracy in the checking operation may be obtained by using a separate parity check bit for each column of the card, as there are less binary digits in a single column than in a group of columns or in a card row.

It is therefore an object of the present invention to provide in a card punching machine a checking device for comparing the entered information with the read information by using a separate parity check bit for each card column.

Another object of the present invention is to provide an improved checking device generating a parity check bit from the information entered to control the operation of a card punching machine.

In the known machines before cited check digits are generated from the read information and subsequently compared with previously generated check digits, as stated above. Therefore separate check digit generating means and comparing means are provided, thus requiring complicated and expensive circuitry.

Accordingly, a further object of the present invention is to provide a device for comparing the information read from a punched card with a check symbol previously generated, said comparing operation and said card reading operation being simultaneously performed.

A further object of the present invention is to provide in a card punching machine a plurality of similar magnetic core matrix planes to store the information to be entered to control the punching operation, some matrix planes being used to generate, store and compare said check bits.

These and other objects and features of the invention will become apparent from the following description of a preferred embodiment thereof, taken in conjunction with the accompanying drawings, in which.

Figures 1, 2:
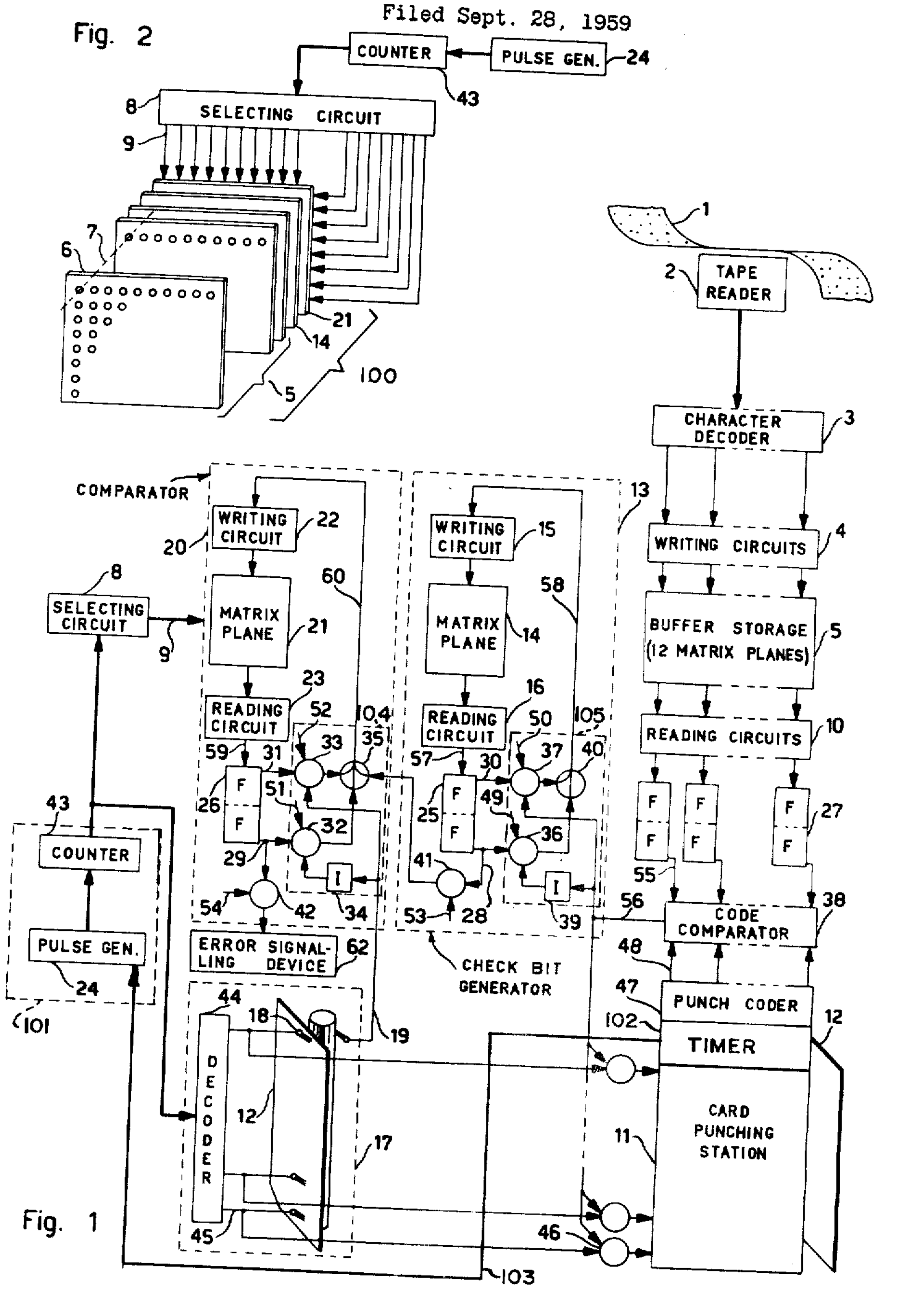
FIG. 1 shows a block diagram of the checking device according to the invention.
FIG. 2 shows how the matrix planes are arranged in the card punching machine embodying the invention.

Reference is made to a record processing machine such as a record card punching machine, which may be controlled by either a magnetic or punched record tape or by any other suitable control record.

The information stored in the tape of the tape-to-card converter is fed to a buffer storage in which it is temporarily stored, and therefrom entered to control the recording operation of the record card punching station of the machine according to a predetermined sequence.

It is assumed that the record card is of the known type comprising eighty columns and twelve rows of binary index point positions, thus containing 960 information bits, each one represented by the presence or the absence of a hole.

Designating as a "character" the group of twelve bits recorded in the twelve index point positions of a single column of the card, the whole information of a card will be represented on the tape as a block of eighty characters. The characters of said block may be stored on the tape according to any suitable code.

The intelligence read from the tape 1 by a known tape reader 2 is translated into the card code by a character decoder 3 and thence transferred to the writing circuit 4 of a buffer storage 5.

The buffer storage 5 may be of the magnetic core matrix type, and for example of an array of twelve two-dimensional matrix planes each one comprising eighty cores, each group of twelve cores similarly positioned within the corresponding matrix planes forming a register allotted to a predetermined card column and being arranged to store a code representation of the character to be punched in said card column.

The eighty groups of cores may be selected by a selecting circuit 8, the twelve cores of each group 7 being simultaneously selected. Assuming (FIG. 2), that in each matrix plane 6 the eighty cores are arranged in eight rows and ten columns, the output 9 of the selecting circuit 8 will comprise eight row wires and ten column wires. Each selecting wire is threaded through all the cores of the corersponding row or column, respectively, of all the matrix planes. Therefore, to select a predetermined group the pair of row and column selecting wires coupled to the cores of said group are selected.

A separate read wire coupled to all the cores of each matrix plane is connected to a conventional individual reading circuit for said matrix plane. Upon interrogation of the selected core the reading circuit of the respective matrix provides an output signal indicative of the previous state of the core. The numeral 10 generally indicates the twelve reading circuits for the buffer storage 5.

A separate inhibit wire coupled to all the cores of each matrix plane is connected to a conventional writing circuit individual to said matrix plane. The twelve writing circuits of the buffer storage 5 are generically indicated by the numeral 4 in FIG. 1.

The writing circuits 4 are intended to be so arranged that if the input of an individual writing circuit is energized during the writing operation, a bit "1" is written into the selected core of the corresponding matrix plane.

The numeral 11 designates a conventional card punching station comprising 960 punches arranged in eighty rows and twelve columns.

The numeral 13 generally designates a check bit generator adapted to generate for each record card a parity check symbol comprising a check bit for each card column. More particularly, the check bit generator 13 includes a first storage 14 provided for each card column with a separate check bit generating binary storage element, such as a magnetic core. In each core a parity check bit is generated under the sequential control of the binary informations entered in the punching station 11 on the corresponding card column.

The storage 14 may be a matrix plane comprising eighty magnetic cores arranged like the cores in a matrix plane of the buffer storage 5 and having a common writing circuit 15 and a common reading circuit 16.

The eighty cores of the matrix plane 14 may be selected by the selecting circuit 8, whereby each core of the matrix plane 14 is selected concurrently with the corresponding group of cores similarly positioned within the matrix planes of the buffer storage 5. Therefore, each one of the eighty cores of the matrix plane 14 is allotted to a predetermined column of the card.

The numeral 17 designates a conventional card sensing station, to which the punched cards are fed from the punching station 11.

At the sensing station 17 the card 12 is sensed row by row by a set of eighty aligned brushes 18, each one arranged to scan a card column.

While a row of the card to be sensed is located under the brushes, the brushes are sequentially energized by electrical pulses to sequentially sense the eighty bits of said row and to supply them to an output line 19, a brush 18 being electrically connected or not to the output line 19 depending upon whether a hole is sensed or not.

Therefore, referring to a single card column, it is clear that the sensing station is arranged for sequentially sensing the binary information on each index point position of said column, whereby on the output line 19 under the control of the sensing station 17 a signal is generated responsive to each sensed binary information having a predetermined binary value and represented by a hole on the record card.

Between the check bit generator 13 and the sensing station 17 a comparator 20 is arranged to compare the information sensed from the punched card at the sensing station 17 with the check symbol previously generated by the check bit generator 13 and transferred to the comparator 20, as will be hereinafter described.

The comparator 20 includes a second storage 21 provided for each card column with a separate comparing binary storage element, and similar to the first storage 14. Each comparing binary storage element is arranged to compare the check bit of the corresponding column with the number of signals generated on the output line 19 under the control of the binary informations sensed on said column, said number being equal to the number of holes detected in said column.

The storage 21 is provided with a writing circuit 22 and a reading circuit 23 common to all the cores, and is connected to the selecting circuit 8 as are the storages 5 and 14. Therefore, each one of the eighty cores of the storage 21 is also allotted to a predetermined card column.

It is thus apparent that a common selecting circuit 8 is provided for the storage means 100 which include the buffer storage 5, the first storage 14 and the second storage 21, whereby the fourteen cores of each plurality of cores similarly positioned within the matrix planes of the storages 5, 14 and 21 are simultaneously selected. Each plurality of cores corresponds to a card column and includes the group of cores, the check bit generating core and the comparing core of said column.

A separate staticizing flip-flop is connected to the output of the reading circuit 10, 16 and 23 of each matrix plane of the storages 5, 14 and 21, respectively, said flip-flop being arranged to store the bit read from a core until the subsequent writing operation is performed, whereupon the flip-flops are reset by a pulse produced by a pulse generator 24.

More particularly, numerals 25 and 26 designate the individual flip-flops of the storage 14 and 21, respectively, while numeral 27 generically designates the twelve flip-flops of the buffer storage 5.

In the steady-state condition the outputs 28 and 29 of the flip-flops 25 and 26 are not energized, while the outputs 30 and 31 are energized. The outputs 29 and 31 of the flip-flop 26 are connected to "and" gates 32 and 33, respectively.

The output 19 of the sensing station 17 is directly connected to the gate 33, and via an inverter 34 to the gate 32. The outputs of the gates 32 and 33 are connected through an "or" gate 35 to the writing circuit 22 of the matrix plane 21. The gates 32, 33 and 35 and the inverter 34 act as a half-adder 104, comprising inputs 19 and 29, 31 fed by the sensing station 17 and by the reading circuit 23 respectively, and an output 60 feeding the writing circuit 22.

Similarly, the outputs 28 and 30 of the flip-flop 25 are connected to "and" gates 36 and 37, respectively. The output of a code comparator 38, hereinafter described, is directly connected to the gate 37 and via an inverter 39 to the gate 36. The outputs of the gates 36 and 37 are connected through an "or" gate 40 to the writing circuit 15 of the matrix plane 14. The gates 36, 37 and 40 and the inverter 39 act as a half-adder 105 comprising inputs 56 and 28, 30 fed by the code comparator 38 and by the reading circuit 16 respectively, and an output 58 feeding the writing circuit 15.

An "and" gate 41 is used to control the transfer of the check symbol from the check bit generator 13 to the comparator 20; an "and" gate 42 is used to indicate errors detected during the checking operation by the comparator 20.

The tape-to-card converter is arranged for cyclic operation, each cycle comprising a reading step and a punching step. During the reading step a complete block of eighty characters to be punched on a card 12 is read from the tape 1 into the buffer storage 5. During the punching step said block of characters is read from the buffer storage 5 and entered both to the card punching station in order to control the punch selector magnets and to the check bit generator 13 in order to generate the check symbol used for checking the recording operation on the card.

During the punching step of the immediately following machine cycle the card 12 just punched is sensed at the sensing station 17, and the sensed information is compared by the comparator 20 with the check symbol previously generated by the check bit generator 13, while the punching station 11 punches the next card and the check bit generator 13 simultaneously generates the check symbol therefor.

During the punching step of each machine cycle the 960 punches of the punching station 11 are selected row by row and in each row column by column. Therefore, referring to a single card column, it is clear that the card punching machine is ararnged for sequentially entering a binary information into each index point position of said card column. At the end of the punching step all the selected punches are simultaneously actuated, whereby the card is punched.

The punching station 11 itself comprises first timing means 102 including a timer adapted to provide timing signals to divide each machine cycle into eighteen cycle points or index times, twelve index times being allotted to the punching step according to the twelve rows or index point positions of a card, the remaining six index times being allotted to the reading step. The first timing means 102 are associated with second timing means 101, including a pulse generator 24 and a binary pulse counter 43.

More particularly, the timing means 102 provide an initial timing signal at the beginning of each index time which through a line 103 starts the pulse generator 24 feeding the binary pulse counter 43 arranged to count up to eighty, to define eighty sequential column times, and then to stop the generator 24. The output of the counter 43 when counting from one to eighty feeds the selecting circuit 8 to sequentially supply same with the addresses of the eighty pluralities of cores of the storages 5, 14 and 21, whereby said storages are completely scanned once at each index time of the punching step. Furthermore, whenever a plurality of cores is selected, the generator 24 sends to the corresponding pair of selecting wires the proper read and write pulses. Therefore, it is clear that the initial timing signal of each index time of the punching step by starting the generator 24 generates a series of eighty bit storage cycles, during each one of which the selecting, reading and writing operations are sequentially performed for the corresponding plurality of cores.

Furthermore, the counter 43 when counting up to eighty sequentially energizes through a decoder 44 the eighty leads 45 connected to the brushes 18, thus sequentially sensing the eighty bits of the card row actually sensed. At the same time by energizing the leads 45 the counter 43 sequentially sends a gating signal to eighty "and" gates 46 controlling the operation of the punches of the card punching station 11 corresponding to the eighty card columns, in synchronism with the scanning of the corresponding pluralities of cores of the storages 5, 14 and 21.

The output of each gate 46 when energized enables the punches of the corresponding card column to be selected, the card row to be punched being sequentially selected in a known manner by the timing signals generated by the punching station 11 itself. Moreover, during each index time a punch coder 47 set up by the punching station 11 indicates to the code comparator 38 what is the card row to be processed during said index time. The punch coder 47 is provided with twelve outputs 48 each one corresponding to a card row, each output being energized during the entire index time required by the punching station 11 to select the punches for the corresponding card row. The reading circuits 10, the code comparator 38 and the punch coder 47 act as means for extracting from the selected plurality of cores of the storage means 100 the information bit of the row indicated by the punch coder 47.

In the sensing station the punched card is stepwise fed past the sensing brushes 18 in synchronism with the sequential energization of the outputs 48 of the punch coder 47, and with the sequential selection of the card rows in the punching station.

During each one of the twelve index times of the punching step the punching station generates a signal over the inputs 49, 50, 51 and 52, thus opening the gates 36, 37, 32 and 33, respectively, and a signal over the inputs 53 and 54, thus inhibiting the gates 41 and 42, respectively.

Considering now the first index time of the punching step, when the punches are selected for the first row of the card, at the beginning of said index time the punching station 11 activates the pulse generator 24, whereby the counter 43 begins to count, and during said index time it energizes the first output of the punch coder 47.

Therefore, the counter 43 energizes through the decoder 44 the first brush 18; furthermore, it causes the first plurality of cores of the storages 5, 14 and 21 to be selected; finally, it provides a gating signal on the input 45 of the first gate 46 enabling the punches of the punching station 11 to be selected for the first column of the card.

Thereupon the selected cores are interrogated, whereby the character stored in the first group of cores of the buffer storage 5 is read out in parallel over the output leads 55 through the staticizing flip-flops 27.

Assuming said character requires a hole to be punched in the first row of the card, the code comparator 38 generates a signal representing the information bit of the first row of the first column on the output 56, the first right-hand input 55 and the first left-hand input 48 being concurrently energized. Said signal is fed to the punching station 11 to select the punch of the first row of the first column, the first gate 46 being opened by the counter 43 through the decoder 44. Thereupon, as the write pulses are fed by the generator 24 to the selected cores, the character just read out is entered into the writing circuit 4, through a known regeneration circuit not shown in the drawings, whereby said character is written again into the selected cores.

In the matrix plane 14 the first core is interrogated to read out its binary contents; since a punch has not yet been selected for the first column in the punching station 11, said core is in the state "0," as will be seen. Therefore, no signal appears on the output 57 of the reading circuit 16, whereby the flip-flop 25 remains in its prior state and the output 30 connected to the gate 37 remains energized.

The gate 37 allows the signal appearing on the output 56 of the code comparator 38 to be transferred via the "or" gate 40 to the input 58 of the writing circuit 15, thus causing the selected core of the matrix plane 14 to be driven to the state "1," opposite to the state of the core prior to its interrogation.

In the matrix plane 21 the first core is interrogated as well; if said core was in the state "1,", the read pulses drive the core to the state "0" and produce on the output 59 of the reading circuit 23 a signal effective to commutate the flip-flop 26, whereby the output 29 becomes energized.

Simultaneously, the first column of the first row of the card punched in preceding machine cycle is sensed at the sensing station 17; if a hole is detected, a signal is obtained on the output lead 19. The gate 33, whose input 31 is not energized, blocks said signal which after having been inverted by the inverter 34 cannot pass the gate 32. Thus no signal is obtained on the outputs of the gates 32 and 33 and thus of the gate 35. The input 60 of the writing circuit 22 being not energized, the first core of the matrix plane 21 remains in the state "0" upon receiving the write pulses. It will thus be apparent that said core remains in the state to which it had been driven by the read pulses, opposite the state in which was prior to the interrogation.

During the next following bit storage cycle, the generator 24 sends to the counter 43 the second count signal, whereby the counter advances one step, thus causing the second plurality of cores of the storages 5, 14 and 21 to be selected and the second brush 18 as well as an input of the second "and" gate 46 to be energized. Said second count signal moreover resets all the staticizing flip-flops of the three storages.

Then the selected cores are interrogated, whereby the second character is read out through the staticizing flip-flops 27.

Assuming said character does not require a hole to be punched in the first row of the card, no signal appears on the output 56 of the code comparator 38, the first right-hand input 55 being not energized while the only first left-hand input 48 remains energized. Therefore the output of the second gate 46 being not energized, the punch of the second column of the first row is not selected in the punching station 11. Upon receiving the write pulses, the second character is stored again in the selected cores through the regeneration circuit, as stated above.

In the matrix plane 14 the second core is interrogated. Since it is in the state "0," no signal appears on the output 57, whereby the flip-flop 25 remains in its prior state, maintaining the output 30 energized.

As the output 56 of the code comparator 38 is not energized, neither the gate 36 nor the gate 37 have both their inputs energized, whereby no signal is obtained on the output of the gate 40. The input 58 of the writing circuit 15 being not energized, the second core of the matrix plane 14 remains in its state "0" upon receiving the write pulses, namely, in the state assumed prior to the interrogation.

In the matrix plane 21 the second core is interrogated as well; if said core was in the state "1," a signal is obtained on the output 59 triggering the flip-flop 26 to energize the output 29.

Simultaneously, at the sensing station 17 the second column of the first row of the card punched in the preceding machine cycle is sensed; if no hole is detected, no signal appears on the output 19, whereby the inverter 34 causes the corresponding input of the gate 32 to be energized, thus producing a signal on the output of said gate. Said signal is fed via the "or" gate 35 to the input 60 of the writing circuit 22, thus causing the second core of the matrix plane 21 upon receiving the write pulses to be restored to the state "1" in which it was prior to the interrogation.

During the next following bit storage cycle the generator 24 advances the counter 43 one step, whereby the third column of the first row is processed, and so on for the following card columns. After having processed the eighty columns of the first row the counter 43 stops the generator 24. At the beginning of the second index time the generator 24 is rendered again operative by the punching station 11 as described hereinabove, thus sequentially causing the eighty pluralities of cores to be selected, and both the eighty brushes 18 and inputs 45 to be energized, whereby the second row is processed, and so on for the following rows.

Summarizing, in the first storage 14 the binary contents of each core is sequentially read out twelve times during the twelve index times of the punching step respectively, concurrently with the recording operation of the punching station 11 in the twelve index point positions of the corresponding card column. Furthermore, during each index time said read out contents is rewritten or not into said core depending upon whether a hole is to be punched or not into said index point position, the operation of the writing circuit 15 being conditioned by the binary information entered by the punching machine into said index point position.

Likewise, in the second storage 21 the binary contents of each core is sequentially read out twelve times during the twelve index times of the punching step respectively, concurrently with the sensing operation of the sensing station 17 in the twelve index point positions of the corresponding card column. Furthermore, during each index time said read out contents is rewritten or not into said core depending upon whether a hole is sensed or not, the operation of the writing circuit 22 being conditioned by the signal concurrently generated on the output 19 of the sensing station 17.

In order to clarify the operation of the check bit generator 13 and of the comparator 20 for all the possible cases, it will be assumed that the bit on the output 56 is "1" or "0," depending upon whether a punch is to be selected or not; that the bit on the output 19 is "1" or "0" depending upon whether a hole is sensed or not; that the bit on the outputs 57 and 59 of the reading circuits 16 and 23, respectively, is "1" or "0" depending upon whether it is obtained by interrogating a core being in the state "1" or "0"; that a bit "1" on the inputs 58 and 60 of the writing circuits 15 and 22, respectively, causes the selected core of the storages 14 and 21, respectively, to be driven to the state "1" and that a bit "0" on said inputs drives said cores to the state "0." The operation of the comparator 20 of the check bit generator 13 may be then summarized by the following table:

| Outputs 56, 19, respectively | Outputs 57, 59, respectively | Inputs 58, 60, respectively |
|---|---|---|
| 1 | 0 | 1 |
| 0 | 0 | 0 |
| 1 | 1 | 0 |
| 0 | 1 | 1 |

It is thus apparent that each bit "1" from the code comparator 38 upon completion of the bit storage cycle drives the concurrently selected core of the matrix plane 14 to the state opposite to its prior state, and that each bit "0" from the code comparator 38 leaves the core in its prior state. Similarly, each bit "1" from the card sensing station 17 upon completion of the bit storage cycle drives the concurrently selected core of the matrix plane 21 to the state opposite to its prior state, and each bit "0" from the sensing station 17 leaves the core in its prior state.

Therefore, each core of the matrix planes 14 and 21 acts as a binary pulse counter with respect to the signals appearing on the lines 56 and 19, respectively.

It should be remarked that each core of the matrix plane 14 is sequentially fed with all and only the signals generated by the code comparator 38 and entered to select the punches for the corresponding column. Furthermore, as will be seen, before processing a card the matrix plane 14 is cancelled by resetting all the cores of said matrix plane to the state "0."

Therefore, at the end of the punching step of the machine cycle, namely after having selected the punches for all the rows of the card, each core of the matrix plane 14 is either in the state "1" or in the state "0" depending upon whether the number of holes to be punched in the corresponding column according to the signals supplied by the code comparator 38 is odd or even. The contents of the matrix plane 14 at the end of the punching step of the machine cycle forms the parity check symbol of the card just punched, consisting of eighty check bits, each check bit being "1" or "0" depending upon whether the number of holes to be punched in the corresponding column is odd or even.

At the end of the punching step said check symbol is transferred, as will be seen, from the matrix plane 14 to the matrix plane 21, each check bit being stored into the core allotted to the corresponding column of the card by driving said core from a predetermined initial state, e.g., the state "0," to a state representing said check bit.

During the punching step of the following machine cycle the card just punched is sensed at the sensing station 17, each core of the matrix plane 21 being sequentially fed with all and only the signals generated on the output 19 from the sensing brush 18 scanning the corresponding column of the card. Therefore, each core of the matrix plane 21 corresponding to a core of the matrix plane 14 previously driven from the state "0" to the state "1" upon receiving an odd number of signals from the output 56 is now restored to the initial state "0" upon also receiving an odd number of signals from the output 19. Similarly, each core of the matrix plane 21 corresponding to a core of the matrix plane 14 previously driven from the state "0" again to the state "0" upon receiving an even number of signals, is now restored to the initial state "0" upon also receiving an even number of signals. Finally, if the card has been correctly punched, at the end of the card sensing operation all the cores of the matrix plane 21 must be restored to the initial state "0."

On the contrary, if at the end of the punching step now considered a core of the matrix plane 21 has not been restored to the initial state "0" upon having sensed at the sensing station 17 all the index point positions of the corresponding card column, this means that for said column the check bit and the number of signals generated by the sensing station are not both odd or even, and therefore that an error occurs in said card column, there being an odd number of holes unduly punched or omitted.

Accordingly, upon having sensed all the index point positions of said column, the contents of said core is read out to actuate the error signalling device 62.

More particularly, in order to signal said punching errors for the card just sensed and to simultaneously transfer the check symbol of the card just processed at the punching station 11 from the matrix plane 14 to the matrix plane 21, at the thirteen index time, namely after completion of the punching step, the punching station 11 causes the polarity of the signals on the inputs 49, 50, 51, 52, 53 and 54 to be reversed, to thereby block the gates 36, 37, 32 and 33, and to open the gates 41 and 42. Then the initial timing signal of the thirteen index time starts again the pulse generator 24, thus causing the counter 43 to count from one to eighty the thirteen time since the beginning of the machine cycle, the selecting circuit 8 to be operated and the read and write pulses to be fed to the selected cores. Therefore, the cores of each one of the storages are sequentially scanned again, while the punching station and sensing station are inoperative.

During the first bit storage cycle the counter 43 upon receiving the first signal from the generator 24 causes the cores corresponding to the first card column to be selected in the three storages. Then in the matrix plane 21 the first core is interrogated. If it was in the initial state "0," no signal appears on the output 59, whereby the flip-flop 26 remains in its prior state and no signal is obtained on the output of the gate 42. On the contrary, if said core was in the state "1," upon interrogation a signal is obtained on the output 59 causing the flip-flop 26 to energize the output 29, whereby a signal from the gate 42 actuates the error signalling device 62.

In the matrix plane 14 the first core is also interrogated. If it was in the state "0," no signal appears on the output 57, whereby the flip-flop 25 remains in its prior state. Therefore, no signal energizing the input 60 appears on the output of the gate 41 and the first core of the matrix plane 21 upon receiving the write pulses remains in the state "0," to which it had been driven upon interrogation, namely in the same state as the corresponding core of the matrix plane 14 prior to the interrogation. On the contrary, if the first core of the matrix plane 14 was in the state "1," upon interrogation a signal obtained on the output 57 triggers the flip-flop 25, thus energizing the writing circuit 22 and causing the first core of the matrix plane 21, upon receiving the write pulses, to be driven to the state "1," namely, also in this case to the same state as the corresponding core of the matrix plane 14 before interrogation.

In this way the check bit of the first column is read out of the first core of the matrix plane 14 and stored into the first core of the matrix plane 21.

During the succeeding bit storage cycle the generator 24 sends the second signal to the counter 43, whereby the counter 43 advances one step, thus causing the cores corresponding to the second column of the card to be selected.

In the matrix plane 21 the selected core is interrogated; if it was in the initial state "0," no signal is obtained on the output 59, whereby the flip-flop 26 remains in the prior state and no signal appears on the output of the gate 42. On the contrary, if said core was in the state "1," a signal is obtained on the output 59 which triggers the flip-flop 26 whereby the error signalling device 62 is actuated.

In the matrix plane 14 the second core is interrogated as well. If it was in the state "0," no signal appears on the output 57, whereby the flip-flop 25 remains in the prior state. Therefore no signal energizing the input 60 appears on the output of the gate 41 and the second core of the matrix plane 21, upon receiving the write pulses, remains in its state "0" to which it had been driven upon interrogation, namely, in the same state as the corresponding core of the matrix plane 14 prior to the interrogation. On the contrary, if the second core of the matrix plane 14 was in the state "1," upon interrogation a signal obtained on the output 57 triggers the flip-flop 25, thus energizing the writing circuit 22 and causing the second core of the matrix plane 21, upon receiving the write pulses, to be driven to the state "1," namely, also in this case, to the same state as the corresponding core of the matrix plane 14 before interrogation.

In this way the check bit of the second column is read out of the second core of the matrix plane 14 and stored into the second core of the matrix plane 21 and so on for the following check bits, whereby upon completely scanning the storages the matrix plane 14 will be cleared, thus being ready to form the check symbol for the next card during the next machine cycle, and the matrix plane 21 will store the check symbol of the card just processed in the punching station 11.

In the next following reading step of the machine cycle now considered a new block of characters is read from the tape 1 into the buffer storage 5. To prevent the matrix plane 21 from being cleared during said step, thus causing the check symbol to be lost, a known regeneration circuit not shown is provided for the matrix plane 21, whereby the check digit is stored until the punching step of the following cycle.

Although reference has been made to a conventional punched card, other records may be used as well, e.g. magnetic cards or successive extents of a tape stepwise moved past the punching station and the sensing station. Furthermore, the above described checking device may be used in whatever device for processing blocks of characters wherein each character comprises a plurality of bits.

Finally, if the punching station 11 is of the type wherein the punches selected in a selecting cycle are actuated in the next following cycle, the card being in turn sensed in the next following cycle, a further matrix plane similar to the matrix planes 14 and 21 may be provided to store during the punching cycle the check symbol generated in the selecting cycle and to be used during the sensing cycle. The modifications then required in the circuitry according to the drawings will be obvious to those skilled in the art.

What I claim is:

1. In a machine for processing records having rows and columns of binary index point positions each one bearing an information bit, the information bits of each column representing a character, in combination, first timing means for defining sequential index times corresponding to said rows, second timing means associated with said first timing means for defining sequential column times corresponding to said columns during each one of said index times, storage means comprising for each column of a record a plurality of binary storage elements, each plurality including a group of elements arranged to store a code representation of the character of said column and a check bit generating element, common reading means for said check bit generating elements, common writing means for said check bit generating elements, means controlled by said first and second timing means for sequentially selecting all said pluralities once at each index time, means for extracting from the selected plurality the information bit of the row corresponding to said index time, and a single half-adder common to said check bit generating elements, said half-adder comprising inputs fed by said reading means and said extracting means and an output feeding said writing means, whereby upon having extracted all the bits of said record a parity check bit is obtained for each column in the corresponding check bit generating element.

2. In a machine for processing records having columns of binary index point positions, and comprising means for entering binary informations into each column of a record, and means operable for sequentially sensing the binary information on each index point position of said column, a checking device comprising a check bit generator controlled by said entering means for generating a check bit for each column, a comparator including a storage provided for said column with a separate binary storage element having a predetermined initial state, means for storing said check bit into said storage element, means under the control of said sensing means for generating a signal responsive to each sensed binary information having a predetermined binary value, said comparator further comprising means common to all said storage elements for sequentially reading out the binary contents of said storage element concurrently with the operation of said sensing means, writing means common to all said storage elements, a single half-adder common to all said storage elements and having inputs fed by said sensing means and by said reading means and an output feeding said writing means, an error signalling device, and means operable upon having sensed all the index point positions of said column to read out the contents of said storage element for actuating said error signalling device if said storage element has not been restored to said initial state.

3. In a machine for sequentially processing records having rows and columns of binary index point positions and comprising means operable for entering an information bit into each index point position of a record, the information bits of each column representing a character, in combination, first timing means for defining sequential index times corresponding to said rows, second timing means associated with said first timing means for defining sequential column times corresponding to said columns during each one of said index times, storage means comprising for each column of a record a plurality of binary storage elements, each plurality including a group of elements arranged to store a code representation of the character to be entered in said column, a check bit generating element and a comparing element, first common reading means for said check bit generating elements, second common reading means for said comparing elements, first common writing means for said check bit generating elements, second common writing means for said comparing elements, means controlled by said first and second timing means for sequentially selecting all said pluralities once at each index time, means, controlling said entering means, for extracting from the selected plurality the information bit of the row corresponding to said index time, means controlled by said first and second timing means for concurrently sensing the information bit of said row of the column corresponding to the selected plurality on a preceding record, a first single half-adder common to said check bit generating elements, said first half-adder having inputs fed by said first reading means and by said extracting means and an output feeding said first writing means, a second single half-adder common to said comparing elements, said second half-adder having inputs fed by said second reading means and by said sensing means and an output feeding said second writing means, and means operable upon having entered all the information bits of a record for transferring the contents of each check bit generating element to the corresponding comparing element.

4. In a machine for processing records having rows and columns of binary index point positions each one bearing an information bit, the information bits of each column representing a character, in combination, first timing means for defining sequential index times corresponding to said rows, second timing means associated with said first timing means for defining sequential column times corresponding to said columns during each one of said index times, magnetic core storage means comprising for each column of a record a plurality of cores, each plurality including a group of cores arranged to store a code representation of the character of said column and a check bit generating core, common reading means for said check bit generating cores, common writing means for said check bit generating cores, common selecting wires coupled to the cores of each plurality, means controlled by said first and second timing means for selectively energizing said wires for sequentially selecting all said pluralities once at each index time, means for extracting from the selected plurality the information bit of the row corresponding to said index time, and a single half-adder common to said check bit generating cores, said half-adder comprising inputs fed by said reading means and said extracting means and an output feeding said writing means, whereby upon having extracted all the bits of said record a parity check bit is obtained for each column in the corresponding check bit generating core.

5. In a machine for processing records having columns of binary index point positions, and comprising means for entering binary informations into each column of a record, and means operable for sequentially sensing the binary information on each index point position of said column, a checking device comprising a check bit generator controlled by said entering means for generating a check bit for each column, a comparator including a magnetic core storage provided for said column with a separate core having a predetermined initial state, means for storing said check bit into said core, means under the control of said sensing means for generating a signal responsive to each sensed binary information having a predetermined binary value, said comparator further comprising means common to all said cores for sequentially reading out the binary contents of said core concurrently with the operation of said sensing means, writing means common to all said cores, a single half-adder common to all said cores and having inputs fed by said sensing means and by said reading means and an output feeding said writing means, an error signalling device, and means operable upon having sensed all the index point positions of said column to read out the contents of said core for actuating said error signalling device if said core has not been restored to said initial state.

6. In a machine for sequentially processing records having rows and columns of binary index point positions and comprising means operable for entering an information bit into each index point position of a record, the information bits of each column representing a character, in combination, first timing means for defining sequential index times corresponding to said rows, second timing means associated with said first timing means for defining sequential column times corresponding to said columns during each one of said index times, magnetic core storage means comprising for each column of a record a plurality of cores, each plurality including a group of cores arranged to store a code representation of the character to be entered in said column, a check bit generating core and a comparing core, first common reading means for said check bit generating cores, second common reading means for said comparing cores, first common writing means for said check bit generating cores, second common writing means for said comparing cores, common selecting wires coupled to the cores of each plurality, means controlled by said first and second timing means for selectively energizing said wires for sequentially selecting all said pluralities once at each index time, means controlling said entering means, for extracting from the selected plurality the information bit of the row corresponding to said index time, means controlled by said first and second timing means for concurrently sensing the information bit of said row of the column corresponding to the selected plurality on a preceding record, a first single half-adder common to said check bit generating cores, said first half-adder having inputs fed by said first reading means and by said extracting means and an output feeding said first writing means, a second single half-adder common to said comparing cores, said second half-adder having inputs fed by said second reading means and by said sensing means and an output feeding said second writing means, and means operable upon having entered all the information bits of a record for transferring the contents of each check bit generating core to the corresponding comparing core.

7. In a tape-to-card converter for sequentially processing record cards having rows and columns of binary index point positions and comprising means operable for entering an information bit into each index point position of a card, the information bits of each column representing a character, in combination, a tape reader, first timing means for defining a tape reading step and a card punching step, said last-mentioned step comprising a sequence of index times corresponding to said rows, second timing means associated with said first timing means for defining sequential column times corresponding to said columns during each one of said index times, magnetic core storage means comprising for each column of a card a plurality of cores, each plurality including a group of cores arranged to store a code representation of the character to be entered in said column, a check bit generating core and a comparing core, first common reading means for said check bit generating cores, second common reading means for said comparing cores, first common writing means for said check bit generating cores, second common writing means for said comparing cores, common selecting wires coupled to the cores of each plurality, means fed by said tape reader and controlled by said first timing means for storing into said storage means the code representations of all the characters to be entered in a card, means controlled by said first and second timing means for selectively energizing said wires for sequentially selecting all said pluralities once at each index time, means controlling said entering means for extracting from the selected plurality the information bit of the row corresponding to said index time, means controlled by said first and second timing means for concurrently sensing the information bit of said row of the column corresponding to the selected plurality on a preceding card, a first single half-adder common to said check bit generating cores, said first half-adder having inputs fed by said first reading means and by said extracting means and an output feeding said first writing means, a second single half-adder common to said comparing cores, said second half-adder having inputs fed by said second reading means and by said sensing means and an output feeding said second writing means, and means operable upon having entered all the information bits of a card for transferring the contents of each check bit generating core to the corresponding comparing core.

References Cited in the file of this patent

UNITED STATES PATENTS

| | | |
|---|---|---|
| 2,674,727 | Spielberg | Apr. 6, 1954 |
| 2,702,380 | Brustman | Feb. 15, 1955 |
| 2,884,625 | Kippenhan | Apr. 28, 1959 |
| 2,897,480 | Kumagi | July 28, 1959 |